J. F. GORENFLO.
BEVEL AND ANGLE TOOL.
APPLICATION FILED OCT. 15, 1910.
994,741.
Patented June 13, 1911.
2 SHEETS—SHEET 1.
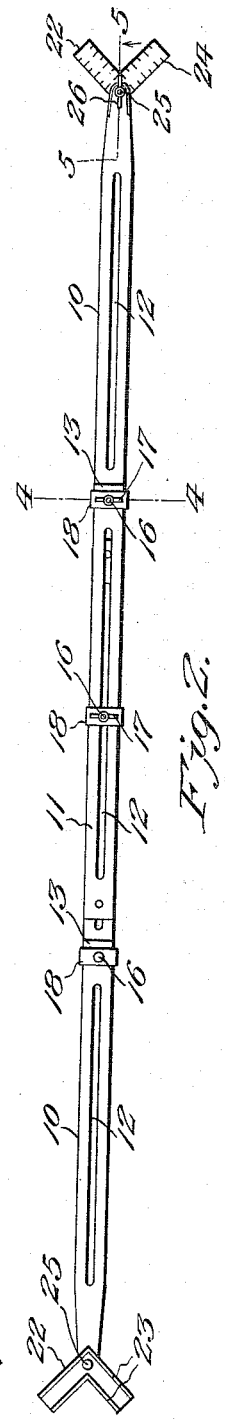
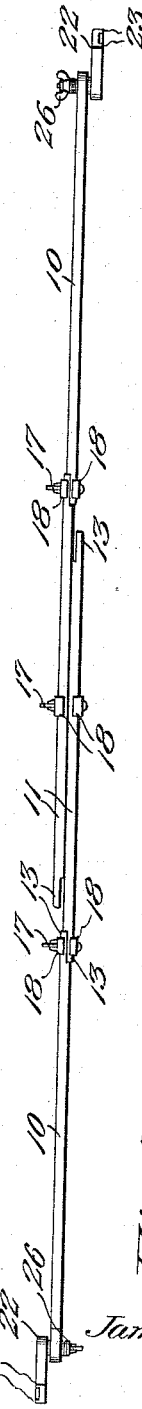
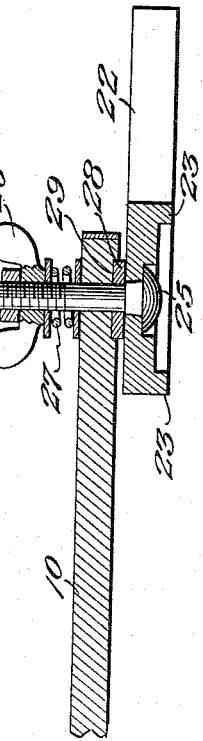
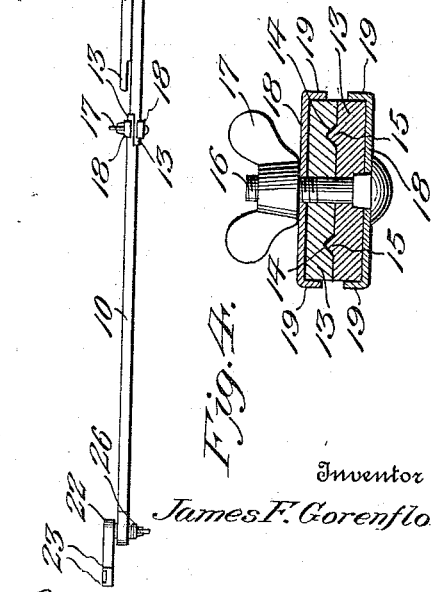
Inventor
James F. Gorenflo J. F. GORENFLO.
BEVEL AND ANGLE TOOL.
APPLICATION FILED OCT. 15, 1910.
994,741.
Patented June 13, 1911.
2 SHEETS—SHEET 2.
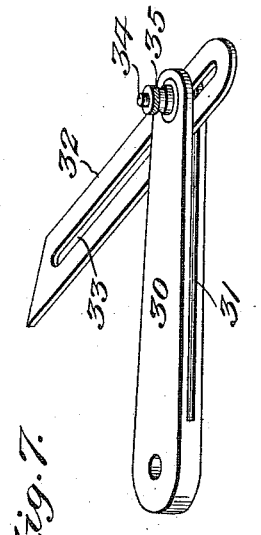
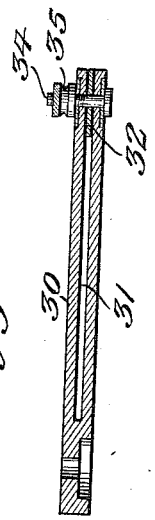
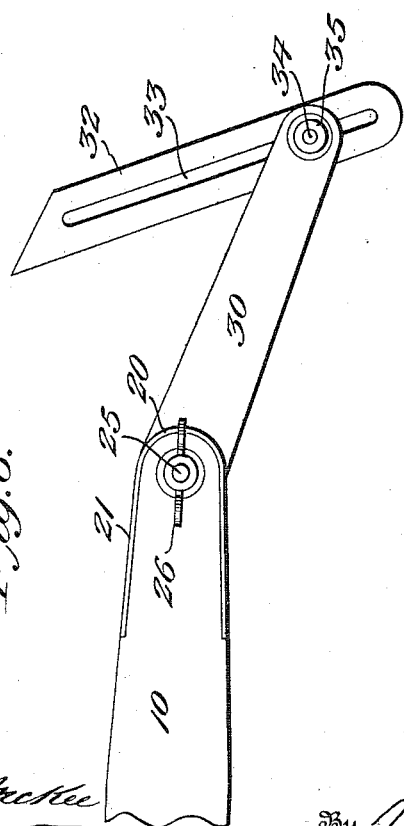
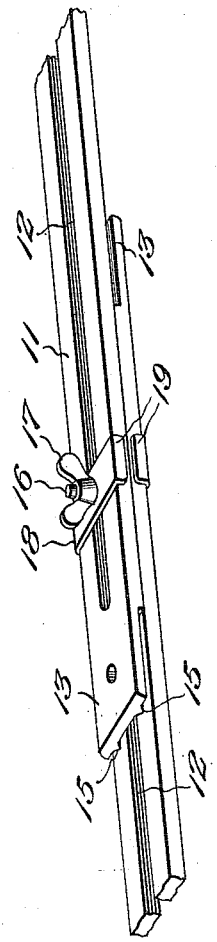
Witnesses
Edwin G. McKee
Inventor
James F. Gorenflo
By Victor J. Evans
Attorney

UNITED STATES PATENT OFFICE.

JAMES F. GORENFLO, OF JAMESTOWN, MISSISSIPPI.

BEVEL AND ANGLE TOOL.

994,741.  Specification of Letters Patent.  Patented June 13, 1911.

Application filed October 15, 1910. Serial No. 587,324.

*To all whom it may concern:*

Be it known that I, JAMES F. GORENFLO, a citizen of the United States, residing at Jamestown, in the county of Marion and State of Mississippi, have invented new and useful Improvements in Bevel and Angle Tools, of which the following is a specification.

The invention relates to a measuring tool, and more particularly to the class of bevel and angle measuring instruments.

The primary object of the invention is the provision of an instrument of this character in which varying angles may be ascertained for the convenience of a workman, thus enabling braces or timbers to be cut accurately for the proper fitting thereof to the work.

Another object of the invention is the provision of an instrument of this character, especially adapted for use by carpenters, stair-builders, or the like, and is capable of use for ascertaining the correct single or double bevel, and also may be employed to gage the length and breadth of work, or used as a square.

A still further object of the invention is the provision of a tool of this character in which angles and bevels may be ascertained for the proper fitting of the parts or timbers of a piece of work, the instrument being capable of ready and quick adjustment for the convenience of the user.

A still further object of the invention is the provision of a device of this character in which accurate measurements may be ascertained, and also that will enable varying angles and bevels to be properly determined for the convenience of a workman using the tool.

A still further object of the invention is the provision of a tool of this character which is simple of construction, readily and easily adjusted, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a top plan view of a tool constructed in accordance with the invention. Fig. 2 is a bottom plan view thereof. Fig. 3 is a side elevation. Fig. 4 is a sectional view on the line 4—4 of Fig. 1. Fig. 5 is a sectional view on the line 5—5 of Fig. 1. Fig. 6 is a fragmentary top plan view, showing the beveling attachment connected to the tool. Fig. 7 is a perspective view of the beveling attachment removed from the tool. Fig. 8 is a vertical longitudinal sectional view through the same. Fig. 9 is a fragmentary perspective view of the tool, showing one section superimposed upon the other.

Similar reference characters indicate corresponding parts throughout the several views of the drawings.

Referring to the accompanying drawings by numerals, the tool comprises outer and intermediate sections 10 and 11, respectively, although it is to be understood that the intermediate sections may be entirely dispensed with or their number increased, for the shortening and lengthening of the tool, as the occasion may require. Each section is preferably constructed from a single strip of elongated material containing a central elongated slot 12 terminating spaced from the ends thereof. The adjacent ends of the outer and intermediate sections 10 and 11 are rabbeted to provide interfitting overlapped terminals 13, the terminals 13 of the outer sections 10 being provided with spaced V-shaped parallel grooves 14, while the terminals 13 of the intermediate sections are provided with corresponding tongues 15 adapted to fit within the grooves 14, so as to sustain the sections in alinement with each other when fastened together at their overlapped ends, in a manner as will be hereinafter more fully described.

Contained within the overlapped terminals 13 of the said sections are suitable registering openings, through which are passed clamping bolts 16, the same carrying the usual winged nuts 17, the latter working against spaced plates 18, each being formed with inturned ends 19, overlapping the longitudinal side edges of the sections to prevent the splitting thereof. These clamping bolts 16 may be readily detached from the openings in the overlapped terminals of the said sections, so that the plates may be removed therefrom and positioned to bridge the slots 12, and when the same are in this position, the said clamping bolts 16 are passed through the said slots 12 for connecting the sections together, whereby they may be adjusted for increasing or decreasing the length of the tool.

The outer ends of the outer sections 10 are outwardly tapered and provided with rounded edges 20, the same being reinforced by a binding strip 21, the latter being secured in any suitable manner about the rounded edges 20 and to the side edges of the strip. These reinforcing strips 21 will prevent the splitting of the ends of the said sections. Provided in the tapered ends of the outer sections 10 are suitable openings for the connection therewith of angle squares, as will be hereinafter more fully described.

Each angle square comprises the usual angle beam 22, the same having formed on one face outwardly projecting edge ribs 23, the opposite faces of the beam being provided with graduating marks 24 forming a scale in the usual manner. Passed through the beam at the bight thereof is a bolt 25, the latter being passed through the openings in the end of the outer section and carries a winged nut 26, whereby the angle beam may be adjusted and locked when required. Surrounding the bolts 25 and working against suitable bearing washers and the ends of the outer sections 10 are expansible coiled springs 27, the latter serving to hold the beams 22 in close contact with the said sections.

Interposed between the beams 22 and the adjacent ends of the outer sections 10 are soft metal washers 28, the same being fitted in correspondingly shaped counter seats 29 formed in the ends of the sections 10, and serve as frictional mediums for sustaining the angle beams in adjusted position, the washers being preferably constructed from lead. In lieu of the angle beams are adapted to be connected to the outer ends of the sections 10 bevel attachments, each comprising a handle or arm 30, the same being bifurcated for a distance of its length, as at 31, to form a pocket for an adjustable blade 32, the latter being provided with the usual graduating marks serving as a scale, the blade being formed with a central elongated slot 33, through which is passed a binding screw 34, the latter carrying the usual knurled nut 35, and is passed through suitable openings in the arm 30 at one end thereof so as to intersect the bifurcations 31. By means of these binding screws 34, the blades may be adjusted at different angles with respect to the arms of the beveling attachments. The opposite ends of the arms 30 are provided with suitable openings, through which are passed the bolts 25 for connecting the beveling attachments to the outer sections of the tool.

From the foregoing, it is thought that the construction and operation of the invention will be clear and comprehensive and therefore a more extended explanation has been omitted.

What is claimed is:

1. A device of the class described, comprising inner and outer sections, the said inner sections being provided with rabbeted ends, the said outer sections being provided with inner rabbeted ends having spaced longitudinal grooves, spaced longitudinal ribs formed on the rabbeted ends of the inner sections and adapted to engage in the said grooves in the rabbeted ends of the outer sections, means adjustably connecting the inner sections together, means engaging the inner ends of the outer sections and the adjacent ends of the inner sections for locking the sections together, and means adjustably connected to the free ends of the outer sections, whereby an angle of bevel may be obtained.

2. A device of the class described, comprising inner and outer sections, the said inner sections being provided with rabbeted ends, the said outer sections being provided with inner rabbeted ends having spaced longitudinal grooves, spaced longitudinal ribs formed on the rabbeted ends of the inner sections and adapted to engage in the said grooves in the rabbeted ends of the outer sections, means adjustably connecting the inner sections together, means engaging the inner ends of the outer sections and the adjacent ends of the inner sections for locking the sections together, U-shaped plates engaging the outer faces of the outer sections and the adjacent ends of the inner sections, bolt members passed through said plates and the said sections, and winged nuts engaging the bolt members.

In testimony whereof I affix my signature in presence of two witnesses.

JAMES F. GORENFLO.

Witnesses:
R. Moss,
J. R. Reagan.

---

Copies of this patent may be obtained for five cents each, by addressing the "Commissioner of Patents, Washington, D. C."